March 19, 1957     R. L. ESKEN     2,786,109
GAUGING DEVICE
Filed June 18, 1954
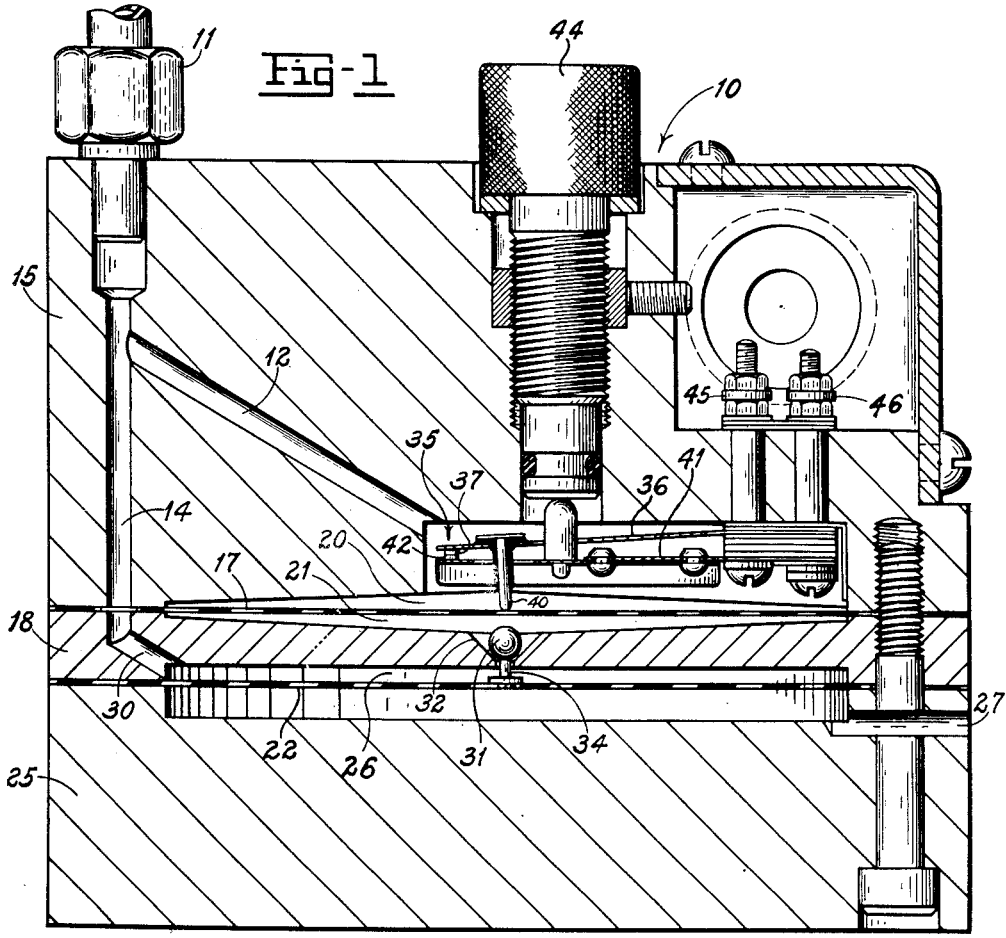
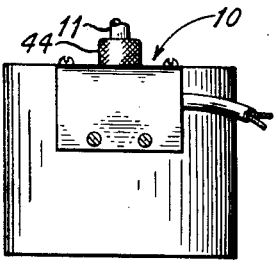
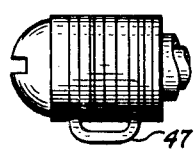
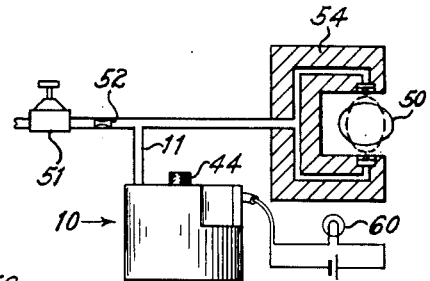
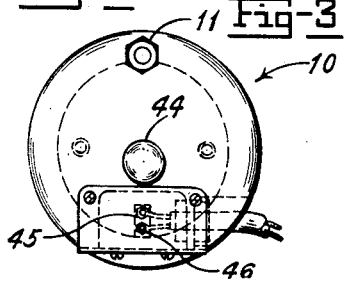
INVENTOR.
Robert L. Esken
BY Edward T. Nor Jr.
atty.

United States Patent Office 2,786,109
Patented Mar. 19, 1957

2,786,109

GAUGING DEVICE

Robert L. Esken, Dayton, Ohio, assignor to The Sheffield Corporation, Dayton, Ohio, a corporation of Ohio Application June 18, 1954, Serial No. 437,680

13 Claims. (Cl. 200—83)

This invention relates to the field of gauging and more particularly it relates to an apparatus for use with gauging systems wherein fluid pressures are obtained which vary in accordance with a characteristic of a product or its movement.

It is an object of this invention to provide such an apparatus which is responsive to a predetermined pressure variation within a range of system gauging pressures, and embodying a simple assembly of a few ruggedly conformed components whereby accurate repeated gauging operations are assured over a long service life.

It is a further object of this invention to provide such an apparatus wherein a pressure responsive movable member is associated with the gauging system and is subjected on each side to the gauging pressures existing therein, the maximum gauging system pressure during a particular gauging operation being applied to both sides of the movable member, following which in the normal course of gauging the lower gauging system pressure is applied to one side of the movable member while the maximum pressure is retained on the other side thereof, whereby the movable member is responsive to the maximum difference in the gauging pressures during each gauging operation and its movements can be utilized to actuate gauging means such as an electric switch or the like.

It is a further object to provide such an apparatus which comprises gauging means responsive to a pressure difference within a range of system gauging pressures and including structure for resetting the apparatus when a system pressure obtains that is outside the range of gauging pressures.

It is a further object to provide such an apparatus wherein a flexible diaphragm is associated with the gauging system by passage means leading from the system to each side of it, one of the passage means being provided with a one-way valve allowing flow to the adjacent side of the diaphragm but restricting the escape therefrom, whereby the maximum gauging system pressures can be applied to both sides of the diaphragm following which the minimum gauging pressure is applied to one side through one of the passage means while the maximum pressure is retained at the other side of the diaphragm by means of the valve structure, resulting in a flexure of the diaphragm proportional to the amount of change is gauging pressure in a particular gauging operation.

It is a further object to provide such an apparatus wherein a pressure responsive means associated with the gauging system is operative to maintain the valve open below a predetermined pressure less than that existing during gauging whereby the maximum obtained pressure is relieved upon completion of a gauging operation and the apparatus is reset for subsequent gauging.

It is a further object to provide an apparatus responsive to a predetermined fluid pressure variation within a gauging system wherein the system pressure is effective through passage means leading from the system to chambers at each side of a flexible diaphragm, the maximum gauging pressure being trapped at one side of the diaphragm by valve means while the lowest pressure is effective on the other side to flex the diaphragm and actuate an electric switch at a predetermined pressure variation, and embodying means operative at a system pressure outside the range of gauging pressures to relieve the trapped pressure and reset the apparatus for subsequent gauging.

Other objects and advantages of the invention will be apparent from the following description, the appended claims and the accompanying drawing in which a preferred form of the invention has been illustrated.

Referring more particularly to the drawing, Figure 1 is a view in central section of an exemplary apparatus embodying the features of this invention, Figure 2 is a side view of the apparatus, Figure 3 is a plan view of the apparatus, Figure 4 is an enlarged detail of a portion of the electrical connections involved in the apparatus, Figure 5 is a diagrammatic illustration of one application of the present apparatus, and Figure 6 is a graph of the pressures existing in the gauging system of Figure 5 as plotted against the total orifice clearance relative to the particular workpiece.

For the purpose of disclosing the present invention one specific structural embodiment of an apparatus including the features of this invention has been illustrated as applied to gauging the roundness of a workpiece. It will be appreciated that this invention is not limited to the structural details disclosed and would have various applications in gauging the characteristics, movement or position of a product or machine part.

The particular apparatus illustrated is one which is responsive to a predetermined variation in pressures in a gauging system during gauging. For example in one application to gauging the roundness of a workpiece the workpiece is rotated while situated between two diametrically opposed fluid leakage orifices. Fluid under controlled pressure is supplied through a restriction and to a passage leading to the leakage orifices. Flow through the orifices and the pressure in the gauging system beyond the restriction will vary with the proximity of the part to the gauging orifices. When the maximum part dimension is adjacent the orifices the minimum flow will be present and the maximum gauging system pressure will be obtained. When the minimum part dimension is adjacent the orifices the minimum system pressure will result. By gauging the variation in these pressures it can be determined whether the "out-of-roundness" of the part is within an allowable tolerance.

In the particular apparatus illustrated the maximum gauging system pressure is applied to both sides of a movable member such as a flexible diaphragm and then the maximum pressure is trapped at one side of the movable member by a valve structure while the other side is subjected to the lowest gauging pressure. The responsive movements of the movable member are utilized to operate a gauging means such as an adjustable switch in the illustrated embodiment. Further pressure responsive means have been provided to open the valve means at a system pressure below that existing during gauging thus relieving the trapped maximum pressure and resetting the apparatus for subsequent gauging operations.

Referring now to the drawing it will be seen that the apparatus 10 as illustrated comprises a connection at 11 whereby the apparatus is adapted for connection to a gauging system. Pressures existing in the gauging system are applied through the connection 11 to passages 12 and 14 formed in the apparatus body 15. A flexible gauging diaphragm 17 is clamped at its periphery between body 15 and a valve plate 18 forming a first chamber 20 between the diaphragm 17 and the body 15 and a second chamber 21 between the diaphragm and valve plate 18. A reset diaphragm 22 is similarly clamped between the valve plate 18 and a base 25 to form a third chamber at 26 between a lower depression in the valve plate 18 and the diaphragm 22. The chamber below the diaphragm 22 in the base 25 is in free communication with atmosphere through a passage 27. Passage 14 communicates with passage 30 in plate 18 leading to chamber 26. A flow controlling ball 31 cooperates with an annular seat 32 in valve plate 18 to act as a check valve permitting flow into chamber 21 but preventing flow therefrom. A contactor 34 carried by reset diaphragm 22 is effective to actuate ball 31 and allow flow from chamber 21 to reset the apparatus for subsequent gauging as will be later described.

An adjustable switch unit 35 included in chamber 20 is responsive to a predetermined deflection of gauging diaphragm 17. A first switch arm 36 carries a switch contact 37 and is moved in accordance with the flexures of diaphragm 17 by a contact 40 which engages the diaphragm. Contact 40 passes through an opening in a second switch arm 41 which carries a second switch contact 42. The arm 41 is adjustable toward and from the adjacent face of diaphragm 17 through an adjustment knob 44 and this adjustment determines the necessary deflection of diaphragm 17 and the necessary pressure variation to open switch contacts 37 and 42. Contacts 37 and 42 are connected through conductive arms 36 and 41 to terminals 45 and 46. Current is conducted from arm 36 and around arm 41 by means of a jumper 47 shown enlarged in Figure 4.

One exemplary application of this apparatus will be described with particular reference to Figures 5 and 6. In Figure 5 the apparatus 10 is shown connected to a gauging system for gauging the out-of-roundness of a part 50. In this system air under regulated pressure is supplied through a regulator 51 and passes through a restriction 52 to opposed gauging orifices in a gauging head 54. The flow from the orifices is controlled by the part 50 therebetween. When the part 50 is at the solid line position as illustrated in Figure 5, the maximum flow will be through the orifices and the minimum gauging pressure will exist in the gauging system beyond the restriction 52. When the part 50 is rotated to the phantom outline position, the flow will be further restricted and the maximum pressure will exist in the system.

To set up the apparatus for gauging a part for out-of-round, a part which is out of round to the maximum allowable degree can be placed between the opposed orifices of gauging head 54 and rotated. As the part is rotated to alternately place the maximum and minimum transverse part dimensions between the orifices the switch unit is adjusted until a signal light 60 just goes out. Thus in following gauging operations when the signal light goes out it indicates that the part is not in tolerance.

Figure 6 diagrams the pressure in the gauging system of Figure 5 (vertical coordinate) against the total clearance between the gauging head orifices and the part 50 (horizontal coordinate). As shown by this graph, when a part is applied to the gauging head 54 the pressure in the system will start to rise. The apparatus, as shown in Figure 1, is in a "no pressure" condition. As the pressure rises it will be applied to both sides of the gauging diaphragm 17 and to the upper side of reset diaphragm 22 as viewed in Figure 1. At a predetermined reset pressure as indicated at 55 in the graph of Figure 6, the pressure on reset diaphragm 22 is sufficient to move the contact 34 away from ball 31 to allow its closing should the direction of flow reverse. The part is rotated in the gauging head 54 and the maximum gauging pressures as indicated by the line 56 will be effective through passage 12 into the first chamber at the upper side of diaphragm 17 and through passages 14 and 30 and through the valve plate 18 to the second chamber below the diaphragm. However, should the pressure start to drop toward the lower gauging pressure as indicated at 57, the ball 31 immediately seats in the annular seat 32 to prevent the escape of the maximum pressure in the chamber 21. As the pressure lowers through passage 12, the diaphragm 17 will flex toward the switch unit 35 by an amount determined by the difference between the maximum and minimum transverse dimensions of the part. If the part is within tolerance the signal light 60 will remain lit. If the part is out of tolerance diaphragm 17 will flex sufficiently to open switch contacts 37 and 42 and de-energize signal light 60. While a signal light 60 has been shown, it will be apparent that this particular illustrated apparatus can be utilized to actuate other electrical devices such as solenoids, relays and the like.

After a gauging operation has been completed the part will be removed from the gauging head 54, resulting in a drop in the gauging system pressure. At the same reset pressure 55 at which the contact 34 clears the ball 31, the contact will again engage the ball to lift it from the seat 32 and allow relief of the trapped maximum pressure from the second chamber 21, thus resetting the apparatus for a subsequent gauging operation.

The gauging apparatus is obviously not limited to gauging an out-of-round condition of an external surface as shown. For example by axially moving a part longitudinally through a gauging head the taper condition of the part can be detected. Because of the unique cooperation of the relatively simply conformed components of this apparatus, it can be relied on for accurate gauging through a long service life. Through the cooperation of the pressure responsive members, accurate gauging of the maximum pressure variations existing in a gauging system is obtained with an automatic reset operation for subsequent gauging upon removal of the part.

While the apparatus herein described constitutes a preferred embodiment of the invention, it is to be understood that the invention is not limited to this precise apparatus described, and that changes may be made therein without departing from the scope of the invention which is defined in the appended claims.

What is claimed is:

1. A gauging apparatus adapted for connection to a gauging system wherein fluid pressures are obtained which vary with a characteristic or movement of a product gauged, said apparatus comprising: gauging means responsive to a predetermined pressure variation within a range of actual gauging pressures in the gauging system, and control means in said apparatus responsive to the pressure within the gauging system and operatively associated with said gauging means to render the gauging means ineffective upon a pressure drop through a predetermined pressure below the range of gauging pressures and for automatically making the gauging means effective upon a pressure rise through the same predetermined pressure.

2. A gauging apparatus adapted for connection to a gauging system wherein fluid pressures are obtained which vary with a characteristic or movement of a product gauged, said apparatus comprising: a movable member responsive to the difference between pressures applied to the sides thereof, passage means in closed communication with each side of said movable member and adapted for connection to the gauging system, a one-way check valve means in one of said passage means allowing free flow to the associated side of said movable member but acting to prevent fluid escape therefrom, whereby the maximum gauging pressure is held against one side of said movable member while different pressures are effective on the other, and gauging means responsive to movement of said movable member occurring upon pressure difference thereacross.

3. A gauging apparatus adapted for connection to a gauging system wherein fluid pressures are obtained which vary with a characteristic or movement of a product gauged, said apparatus comprising: a movable member responsive to the difference between pressures applied to the sides thereof, a first passage means in closed communication with one side of said movable member and adapted for free communication with said gauging system, a second passage means in closed communication with the other side of said movable member and adapted for connection to said gauging system, a one-way check valve means in said second passage means allowing free flow to the associated side of said movable member but acting to prevent fluid escape therefrom, whereby the maximum gauging pressure is held against one side of said movable member while different pressures are effective on the other side, gauging means responsive to movement of said movable member, and control means responsive to the pressure within the gauging system operative at a pressure below the range of gauging pressures for opening the check valve means and resetting the apparatus for subsequent gauging operations.

4. A gauging apparatus adapted for connection to a gauging system wherein fluid pressures are obtained which vary with a characteristic or movement of a product gauged, said apparatus comprising: a diaphragm, means providing a pair of chambers, one on each side of said diaphragm, first and second passage means adapted for connection to the gauging system each in closed communication with one of said chambers, a one-way check valve means in one of said passage means allowing a free flow to the associated chamber but acting to prevent fluid escape therefrom, whereby the maximum gauging pressure is held against one side of said diaphragm while different gauging pressures are effective on the other, and gauging means in said apparatus responsive to deflection of said diaphragm and pressure difference thereacross.

5. A gauging apparatus adapted for connection to a gauging system wherein fluid pressures are obtained which vary with a characteristic or movement of a product gauged, said apparatus comprising: a diaphragm, means providing a pair of chambers, one on each side of said diaphragm, passage means adapted for connection to the gauging system and in closed communication with each of said chambers, a one-way check valve means in one of said passage means allowing free flow to the associated chamber and to one side of said diaphragm but acting to prevent fluid escape therefrom, whereby the maximum gauging pressure is held against one side of said diaphragm while the minimum pressure is effective on the other, gauging means in said apparatus operative upon a predetermined deflection of said diaphragm and a predetermined pressure difference within a range of actual gauging pressures in the pressure system, and control means responsive to the pressure within the gauging system for holding the check valve means open at system pressures below a predetermined pressure less than any pressure obtained in actual gauging.

6. A pressure gauge comprising a body containing a diaphragm and providing a chamber at each side of said diaphragm, switch means controlled by said diaphragm, a passage means for subjecting one of said chambers to free communication with a fluid pressure system, a second passage means for subjecting the other chamber to communication with the fluid pressure system, a one-way check valve means in said second passage means permitting flow into the associated chamber but preventing fluid escape therefrom, and means operative upon a predetermined pressure in said second passage means ahead of said check valve means for releasing the pressure on the other side of said check valve means.

7. A pressure gauge comprising a body containing a flexible diaphragm and providing a pair of chambers, one on each side of said diaphragm, a passage means for subjecting a first of said chambers to free communication with a fluid pressure system, a second passage means for subjecting the second of said chambers to communication with the fluid pressure system, flow control means permitting flow into the second chamber but preventing fluid escape therefrom, whereby the maximum system pressure is held in said second chamber while the minimum system pressure is effective in the other, switch means operatively associated with said diaphragm and responsive to a predetermined deflection thereof and a predetermined pressure variation within the fluid pressure system, and means operative upon a predetermined pressure in said fluid pressure system for releasing the pressure in said second chamber.

8. A gauging apparatus adapted for connection to a gauging system wherein fluid pressures are obtained which vary with a characteristic or movement of a product gauged, said apparatus comprising: a diaphragm, means providing a pair of chambers one on each side of said diaphragm, a passage connected to a first of said chambers and adapted for free communication with said gauging system, the second of said chambers including a wall adjacent the face of the diaphragm, a passage through said wall disposed centrally with respect to said diaphragm and including an annular ball seat at the end thereof adjacent the diaphragm, a flow controlling ball carried in said seat effective to prevent fluid escape from the associated chamber but allowing flow thereinto, means adapted for placing both said passages in communication with said gauging system whereby the maximum gauging pressure is held and maintained in the second chamber and against one side of said diaphragm while the minimum pressure is effective on the other, and gauging means responsive to a predetermined flexure of said diaphragm and a predetermined pressure difference within a range of actual gauging pressures in the gauging system.

9. A gauging apparatus adapted for connection to a gauging system wherein fluid pressures are obtained which vary with a characteristic or movement of a product gauged, said apparatus comprising: first and second flexible diaphragms carried in parallel relationship, means providing a first chamber in sealed relationship with the outside face of the first diaphragm, means situated between the diaphragms in sealed relationship with the adjacent inner faces thereof and including a wall extending therebetween providing a second chamber at the inside face of the first diaphragm and a third chamber at the inside face of the second diaphragm, the exterior face of the second diaphragm being exposed to atmospheric pressure, passage means leading to the first and third chambers adapted for connection to said gauging system, a one-way check valve means in said wall situated centrally of said diaphragms allowing free flow into the second chamber but acting to prevent fluid escape therefrom, whereby the maximum gauging pressure applied to the first and second chambers is held in the second chamber while the minimum pressure is effective in the first chamber, switch means in said apparatus operatively associated with said first diaphragm and responsive to a predetermined flexure thereof and a predetermined pressure difference within a range of actual gauging pressures in the gauging system, and control means carried by said second diaphragm operatively associated with said check valve means effective upon a pressure rise through a predetermined pressure below the range of gauging pressures to release the check valve and operative upon a pressure drop through the same predetermined pressure to open the check valve means and reset the apparatus for subsequent gauging.

10. A gauging apparatus for connection to a system having a flow path subjected to pressure increases and decreases during gauging comprising, means providing a pair of pressure chambers, passage means for placing one of said chambers in communication with said flow path, passage means for placing the other of said chambers in communication with said flow path, means in one of said passage means for trapping the highest pressure in the respective chamber while the other chamber is subjected to pressure decreases in the flow path, and gauging means responsive to the pressure difference between the chambers and the amount of pressure variation in the flow path.

11. A gauging apparatus for connection to a system having a flow path subjected to pressure increases and decreases during gauging comprising, means providing a pair of pressure chambers, passage means for placing one of said chambers in communication with said flow path, passage means for placing the other of said chambers in communication with said flow path, means in one of said passage means for trapping the highest pressure in the respective chamber while the other chamber is subjected to pressure changes in the flow path, gauging means responsive to the pressure difference between the chambers and the amount of pressure variation in the flow path, and resetting means for relieving the trapped pressure following gauging.

12. A gauging apparatus for connection to a system having a flow path subjected to pressure variation through a range during gauging comprising, means providing a pair of pressure chambers, passage means communicating with each of said chambers for connection to the same pressure source in said flow path to receive the same pressures therefrom, one-way check valve means in one of said passage means for checking fluid flow in one direction while permitting flow in the other, whereby the pressure at one limit of the pressure variation range is trapped in the respective chamber while the pressure in the other chamber varies with that in the flow path, and gauging means responsive to the pressure difference between the chambers.

13. A gauging apparatus for connection to a fluid system having a flow path subjected to pressure variation through a range during gauging comprising, a movable member responsive to the difference between pressures applied to the sides thereof, passage means in closed communication with each side of said movable member and adapted for connection to the same pressure source in said system for receiving the same pressures therefrom, a one-way check valve means in one of said passage means allowing free flow to the associated side of said movable member but automatically acting to prevent fluid escape therefrom, whereby the maximum pressure obtained is held against one side of said movable member while pressure changes in the flow path continue to be effective on the other, and gauging means operative upon a predetermined movement of said movable member occurring upon a predetermined pressure difference thereacross.

References Cited in the file of this patent

UNITED STATES PATENTS

| | | |
|---|---|---|
| 2,314,266 | Beam | Mar. 16, 1943 |
| 2,324,084 | Horner | July 13, 1943 |
| 2,326,060 | Oplinger | Aug. 3, 1943 |
| 2,396,672 | Bancroft | Mar. 19, 1946 |
| 2,456,994 | Robison | Dec. 21, 1948 |
| 2,571,557 | Fortier | Oct. 16, 1951 |
| 2,647,396 | Aller | Aug. 4, 1953 |
| 2,669,246 | Segerstad | Feb. 16, 1954 |
| 2,707,389 | Fortier | May 3, 1955 |